(12) United States Patent
Dougherty et al.

(10) Patent No.: US 7,734,754 B2
(45) Date of Patent: Jun. 8, 2010

(54) REVIEWING EFFECTIVENESS OF COMMUNICATION RULES SYSTEM

(75) Inventors: Jesse M. Dougherty, Redmond, WA (US); Malcolm E. Pearson, Redmond, WA (US); Shawn M. Thomas, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 991 days.

(21) Appl. No.: 11/321,292

(22) Filed: Dec. 28, 2005

(65) Prior Publication Data

US 2007/0150253 A1 Jun. 28, 2007

(51) Int. Cl.
*G06F 15/173* (2006.01)

(52) U.S. Cl. ........................ 709/223; 709/224
(58) Field of Classification Search ................ None
See application file for complete search history.

(56) References Cited

U.S. PATENT DOCUMENTS

| | | | |
|---|---|---|---|
| 5,204,939 A | 4/1993 | Yamazaki et al. | |
| 5,872,930 A | 2/1999 | Masters et al. | |
| 6,073,142 A * | 6/2000 | Geiger et al. | 715/205 |
| 6,208,720 B1 * | 3/2001 | Curtis et al. | 379/114.14 |
| 6,421,709 B1 | 7/2002 | McCormich et al. | |
| 6,473,748 B1 | 10/2002 | Archer | |
| 6,542,075 B2 * | 4/2003 | Barker et al. | 340/506 |
| 6,625,734 B1 | 9/2003 | Marvit et al. | |
| 6,678,828 B1 | 1/2004 | Pham et al. | |
| 6,760,420 B2 * | 7/2004 | Heilmann et al. | 379/189 |
| 6,817,008 B2 | 11/2004 | Ledford et al. | |
| 6,847,989 B1 | 1/2005 | Chastain et al. | |
| 6,931,532 B1 | 8/2005 | Davis et al. | |
| 6,938,021 B2 | 8/2005 | Shear et al. | |
| 6,941,459 B1 | 9/2005 | Hind et al. | |
| 6,954,761 B2 | 10/2005 | Azuma | |
| 6,961,849 B1 | 11/2005 | Davis et al. | |
| 6,978,367 B1 | 12/2005 | Hind et al. | |
| 7,181,017 B1 | 2/2007 | Nagel et al. | |

(Continued)

FOREIGN PATENT DOCUMENTS

EP 1 143 665 A2 10/2001

(Continued)

OTHER PUBLICATIONS

Cuervo, F. et al., "Prime Time for Policy-Based Management", Alcatel Telecommunications Review, Alcatel, Paris Cedex, FR, Jul. 2003, XP007005947, ISSN: 1267-7167, 9 pgs.

(Continued)

*Primary Examiner*—Patrice Winder
*Assistant Examiner*—Azizul Choudhury
(74) *Attorney, Agent, or Firm*—Senniger Powers LLP (57) ABSTRACT

A method for reviewing effectiveness of a rules system applying one or more rules to communication traffic of a group of users. The method analyzes a log containing one or more communications reviewed by the rules system to determine if the communications in the log conforms to the communications policy. The method also identifies one or more of the rules of the rules system violated by the communications when the analyzing the log determines that at least one of the communications in the log does not conform to the communications policy. Other methods determine the effectiveness of planned modifications to a rules system.

15 Claims, 4 Drawing Sheets

U.S. PATENT DOCUMENTS

| | | |
|---|---|---|
| 7,340,438 B2 | 3/2008 | Nordman et al. |
| 7,522,908 B2 | 4/2009 | Hraster |
| 7,613,659 B1 | 11/2009 | Hoffman et al. |
| 2002/0048369 A1 | 4/2002 | Ginter et al. |
| 2002/0082894 A1 | 6/2002 | Azuma |
| 2002/0099823 A1 | 7/2002 | Jemes et al. |
| 2003/0028580 A1 | 2/2003 | Kucherawy |
| 2003/0050911 A1 | 3/2003 | Lucovsky et al. |
| 2003/0101227 A1 | 5/2003 | Fink |
| 2003/0149888 A1 | 8/2003 | Yadav |
| 2004/0059789 A1 | 3/2004 | Shum |
| 2004/0109518 A1 | 6/2004 | Miller et al. |
| 2004/0162741 A1 | 8/2004 | Flaxer et al. |
| 2005/0015264 A1 | 1/2005 | Mutchler |
| 2005/0055578 A1 | 3/2005 | Wright et al. |
| 2005/0204003 A1 | 9/2005 | Vargas et al. |
| 2005/0228867 A1 | 10/2005 | Osborne et al. |
| 2007/0100701 A1 | 5/2007 | Baccon-Gibod et al. |
| 2008/0060080 A1 | 3/2008 | Lim |

FOREIGN PATENT DOCUMENTS

| | | | |
|---|---|---|---|
| WO | 0127772 A1 | 4/2001 | |

OTHER PUBLICATIONS

Rouvellou, et al., *Digital Library, Extending Business Objects with Business Rules*, IEEE Computer Society, 2000, 2 pp.

Bubenko, J.A., Jr., *Objectives Driven Capture of Business Rules and of Informationsystems Requirements*, IEEE Xplore, http://ieeexplore.ieee.org/xpl/absprintf.jsp?arnumber=38421&page=free, Oct. 17, 1993, 1 pg. Le Touquet, France.

Fatima, et al., *An Adaptive Organizational Policy for Multi Agent Systems*-AASMAN, IEEE Xplore, http://ieeexplore.ieee.org/xpl/absprintf.jsp?arnumber=699040&page=free, Jul. 3, 1998, 1 pg., Paris, France.

Meng, et al., *Achieving Dynamic Inter-organizational Workflow Management by Integrating Business Processes, Events, and Rules*, http://www.harris.cise.ufl.edu/projects/publications/dwf.pdf, 25 pp., Department of Computer and Information Science and Engineering, University of Florida, Gainesville, Florida, United States.

Sun Microsystems, Chapter 5 Deployment Design, Online, Feb. 2005, Retrieved Jul. 2009, http://web.archive.org/web20050219003745/http://docs.sun.com/source/819-0058/dep_archetect.html, pp. 1-22.

* cited by examiner

REVIEWING EFFECTIVENESS OF COMMUNICATION RULES SYSTEM

BACKGROUND

Organizations, such as corporations and governmental entities, often are comprised of many users and user groups. These users and user groups may be spread over large physical spaces, or geographic areas, such as in different buildings in the same city, different cities in the same country or region, and even in different countries. Moreover, such users and user groups may also be separated by subject matter, such as different departments in the same or different facilities. The systems, hardware, and software utilized by the different users groups and users to communicate internally and externally may also vary widely from group to group, raising compatibility issues.

Practicing communication governance over such dispersed user groups can be difficult. Many considerations contribute to a comprehensive communications policy, including risk management, compliance with organizational norms, human resources considerations, security issues, regulatory issues, operational policies, and best practices guidelines, to name a few. Moreover, each geographically distinct and/or subject matter distinct group typically operates its own rules system separate from the other groups. Moreover, each distinct group may be governed by different a communication policy implemented by a different set of communication rules forming part of a rules system. Thus, each user group often follows a different communication policy and rules system, without knowledge of the communication policy and rules system of other groups within the organization. As these disparate policies interact with one another, communication rules that once worked well within a small organization may lead to incorrect and even absurd results when applied together.

These conventional systems are effective at enforcing communication policies within a user group of the organization, but are often redundant, wasteful of resources, and may be contradictory when applied together over larger and larger user groups. Moreover, the addition, deletion, and modification of rules may be straightforward with a relatively small set of rules, but with many rules to enforce, the addition of a single rule, coupled with its interaction (e.g., chaining) with other rules may readily lead to unintended prohibitions and allowances of communications. In addition, understanding the impact of changes to the rules system is difficult to predict without simply bringing the changes online and monitoring results in an ad hoc manner. Therefore, a way to easily review the effectiveness of a rules system in implementing a communication policy, suggest modifications to the rules system to better implement the communications policy, and test proposed changes to the rules system would be useful.

SUMMARY

The following simplified summary provides a basic overview of some aspects of the present technology. This summary is not an extensive overview. It is not intended to identify key or critical elements or to delineate the scope of this technology. This Summary is not intended to be used as an aid in determining the scope of the claimed subject matter. Its purpose is to present some simplified concepts related to the technology before the more detailed description presented below.

Accordingly, methods and systems for reviewing the performance of a communication rules system are disclosed. These methods and systems comprise reviewing a log containing previous communications under the rules system and noting those rules violated by the previous communications.

BRIEF DESCRIPTION OF THE DRAWINGS

Corresponding reference characters indicate corresponding parts throughout the drawings.

DETAILED DESCRIPTION

Systems for Reviewing Effectiveness of Rules System

Figure 1:
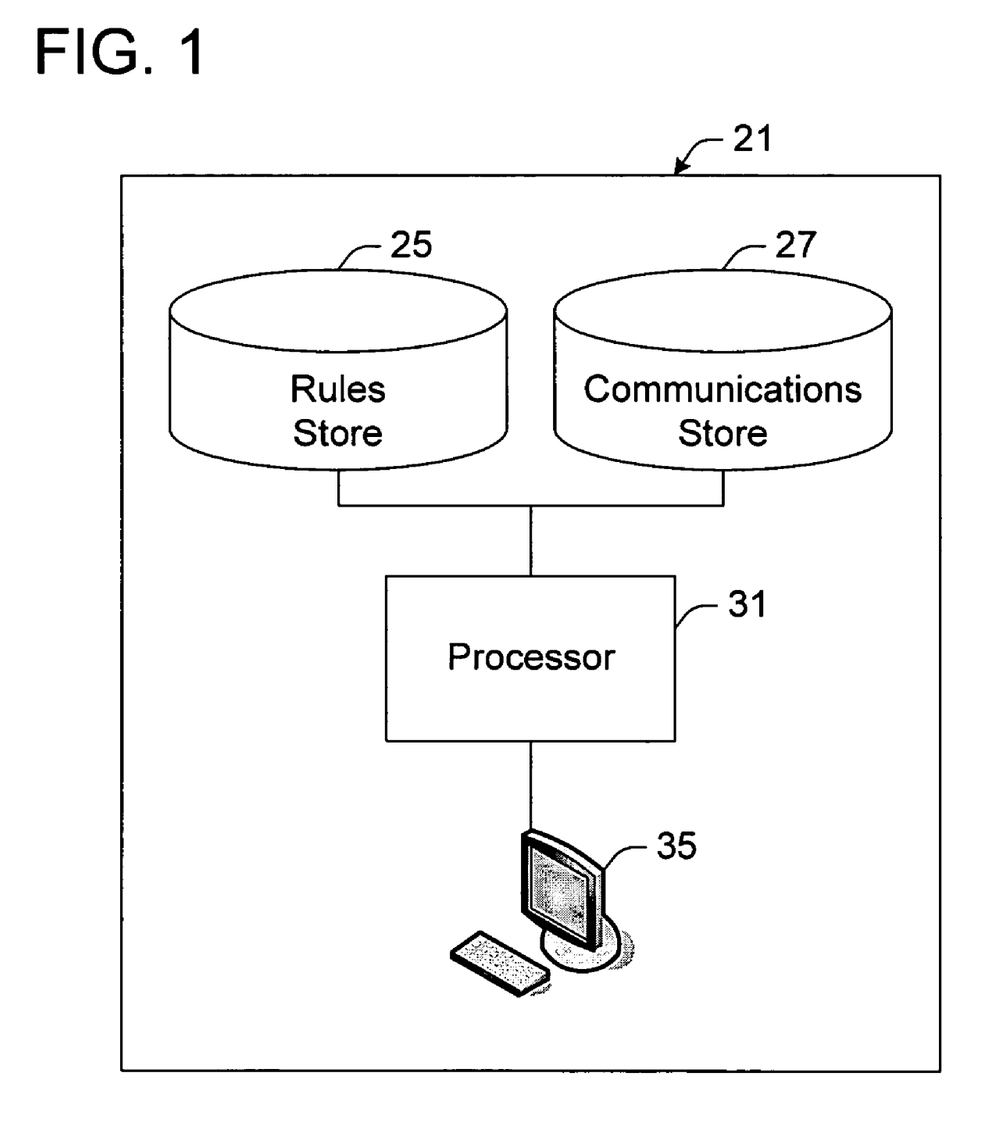
FIG. 1 is a diagram of a system of one embodiment of the present invention.

A control system, generally indicated 21, for reviewing effectiveness of a rules system is depicted in FIG. 1. The rules system applies one or more rules to communication traffic of a group of users. The rules are adapted for conforming the communication traffic to a communications policy, or policies. As used herein, the term "policy" is intended to mean that there are one or more policies. Generally speaking, such a rules system allows a system administrator, under the direction of a communications decision-maker, for example, to establish an automated process for reviewing user communications, such as electronic mail. Such a rules system can block the transmission of one or more communications for a variety of reasons, including prohibited communication content and inappropriate communication channels, among others. The rules system may also journal specific forms of communication. Such rules systems can be difficult to manage because the intent of the rules may not necessarily be borne out in the results if the rules are inappropriately designed, often due to the complexity of interaction of potentially conflicting rules. In other words, the rules established may block a communication that should not be blocked, and vice versa. The control system 21 allows the designer of the rules system, or a manager of the rules system, to review the results of the rules system to ensure it is functioning properly and modify the rules system if necessary.

The control system 21 comprises a rules store 25 containing a copy of one or more rules applied by the rules system. The rules store 25 may store the rules in any format and on any storage medium without departing from the scope of the embodiments of the present invention. The rules stored in the rules store 25 may be copied from the rules system being analyzed, such as via a network connection. Exemplary rules include "user A may not communicate with user B." "communications with objectionable language are prohibited," "users in organization X may not communicate with users in organization Y." "if user A sends a communication to user B, then user C must receive a copy," and "if user A sends a communication to user B, then documents of type Z are prohibited," among others. Any number of different types of rules may be utilized without departing from the scope of the embodiments of the present invention.

The control system 21 further comprises a communications store 27 for collecting one or more communications reviewed by the rules system, such as from a communication log of the rules system. The collected communications may also be copies of key features of those communications, including sender identity, recipient identity, key words, etc. The collected communications are copies of the communications reviewed by the rules system. For example, the collection in the communications store 27 may include all of the electronic mail messages reviewed, blocked, and allowed by the rules system. These communications are stored in the communications store 27 for use by the system 21 in analyzing the rules system, as discussed below in detail. The communications store 27 may store the communications in any format and on any storage medium without departing from the scope of the embodiments of the present invention. The communications stored in the communications store 27 may be copied from the rules system being analyzed, such as via a network connection.

The control system 21 further comprises a processor 31 adapted for accessing the rules store 25 and the communications store 27 for analyzing the communications of the communications store to determine if the communication traffic reviewed by the rules system conforms to the communications policy. The processor 31 further identifies one or more of the rules of the rules system violated by the communications when the analyzing the communications determines that at least one of the communications in the communications store does not conform to the communications policy. The user of the control system 21 may then manually review the violated rules, such as to decide how to appropriately change the rules for better performance of the rules system. In another example, the processor 31 of the control system 21 may further (i) analyze the violated rules to determine a basis for why the violated rules were not effective in conforming the communications in the log to the communications policy and (ii) determine modifications to the rules applied by the rules system facilitating conformance of the communication traffic to the communications policy. This analysis and determination provides the user of the control system 21 with suggested modifications for changing the functionality of the rules system to better meet the goals of the communications policy. As would be readily understood by one skilled in the art, any processing device may be utilized as the processor 31 without departing from the scope of the embodiments of the present invention. For example, a properly designed interference engine could readily perform the functions described above, as well as the methods described below.

The control system 21 may further comprise a user interface 35, such as the personal computer shown in FIG. 1, for communicating the identified one or more rules of the rules system violated by the communication traffic when the analyzing determines that at least one of the communications in the communications store does not conform to the communications policy. The user interface 35 also provides a mechanism for the user of the control system 21 to communicate with the control system, such as for dictating which rules system will be reviewed and which determined modifications will be utilized by the user. Several exemplary methods by which the control system 21 may operate are discussed in additional detail below.

Methods for Reviewing Effectiveness of Rules System

Figure 2:
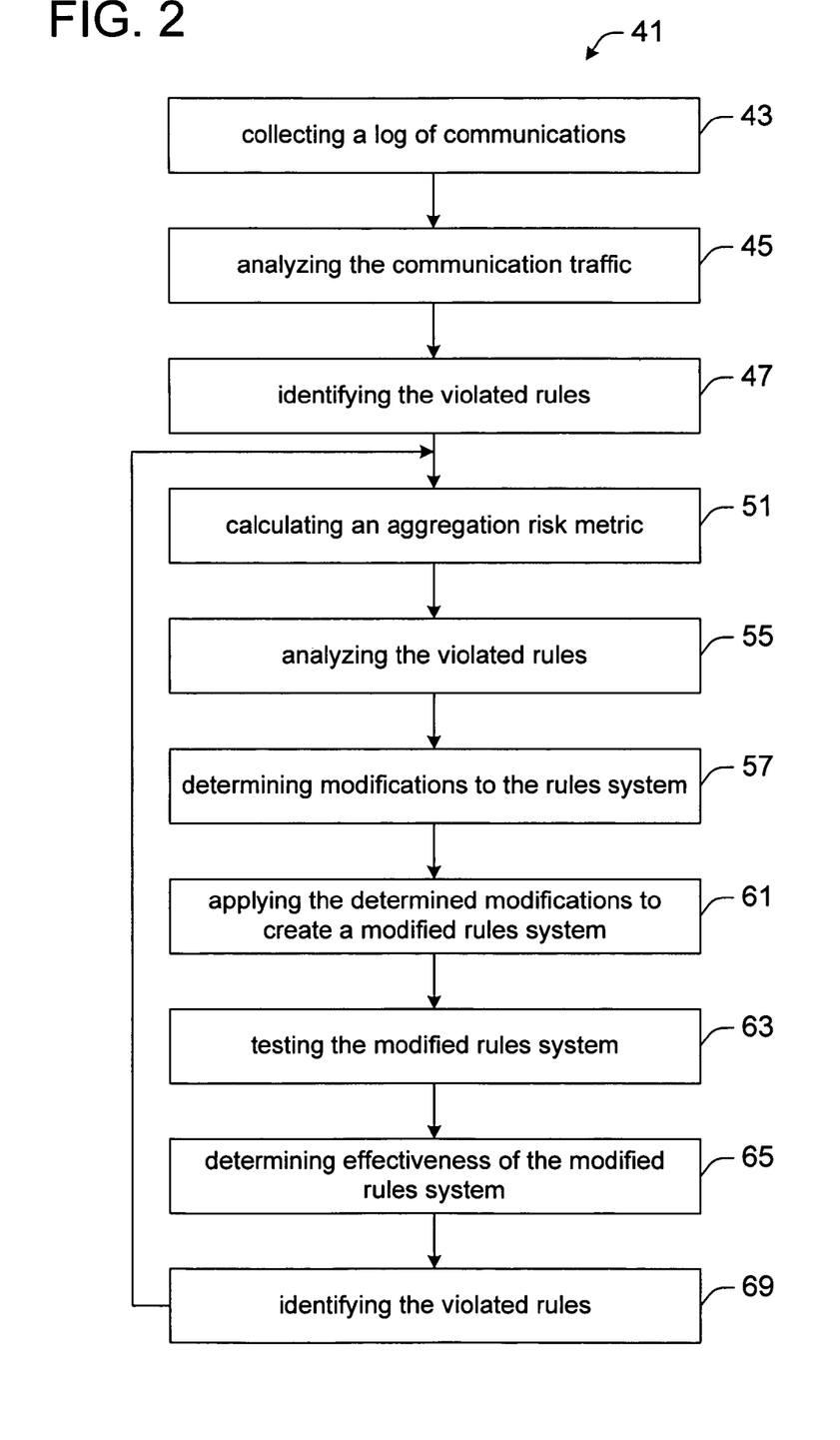
FIG. 2 is a flow diagram of a method of one embodiment of the invention.

A method, generally indicated 41, for reviewing effectiveness of a rules system is disclosed. The rules system applies one or more rules to communication traffic of a group of users, generally as set forth above, for conforming the communication traffic to a communications policy.

The method 41 comprises collecting, at 43, a log containing one or more communications from the communication traffic of a group of users subject to the communications policy. This collection 43 can include gathering communications of several types, such as electronic mail messages and instant messages. Other communication types not specifically listed here are also contemplated as within the scope of the embodiments of the present invention. Moreover, this collecting 43 may include collecting the contents of the communication itself, as well as related data, such as the sender of the communication, the recipients of the communication, the time of the communication, and the relationship between the sender and the respective recipients. Other information related to the communications may also be collected without departing from the scope of the embodiments of the present invention.

The method 41 further comprises analyzing, at 45, the log containing one or more communications reviewed by the rules system to determine if the communications in the log conform to the communications policy. The method 41 further identifies, at 47, one or more of the rules of the rules system violated by the communications when the analyzing 45 the log determines that at least one of the communications in the log does not conform to the communications policy. In this manner, the method 41 can identify 47 the rules likely inhibiting enforcement of the communications policy by the rules system.

The method 41 may further comprise calculating, at 51, an aggregation risk metric based upon the identified 47 violated rules for determining a risk associated with the identified violated rules. Such a calculated 51 aggregation risk metric may assist an administrator of the rules system in quantifying the potential exposure created by the communications allowed by the rules system and understanding the urgency required in addressing the risks.

In another alternative embodiment, the method 41 may further analyze, at 55, the violated rules to determine a basis for why the violated rules were not effective in conforming the communication traffic to the communications policy. Determining such a basis for why the violated rules were ineffective may provide the administrator of such a rules system with valuable insight into how the rules system might be improved.

Moreover, the method 41 may additionally determine, at 57, modifications to the rules applied by the rules system facilitating conformance of the communication traffic to the communications policy. Thus, in addition to determining the basis for an ineffective rule, the determination 57 of modifications provides assistance in reforming the rules system to work properly. In one alternative embodiment, the determining modifications, also at 57, may comprise at least one of adding an additional rule, deleting a rule, and modifying an existing rule of the rules system.

The method 41 may further apply, at 61, the determined modifications to the rules applied by the rules system to create a modified rules system. The method 41 may further test, at 63, the modified rules system on the communications in the log and determine, at 65, effectiveness of the modified rules system to conform the test communications to the communications policy. The testing 63 and determining 65 before any implementation of the modified rules system allows the administrator to further review and revise the modified rules system, if necessary, before applying the modified rules system to any new communications.

In a further example, the method 41 may identify, at 69, one or more of the rules of the modified rules system violated during the testing when the determining 65 effectiveness of the modified rules system determines that at least one of the test communications do not conform to the communications policy. In this manner, the method 41 can identify 69 the rules likely inhibiting enforcement of the communications policy by the modified rules system. The administrator may again review these violated rules to determine potential changes to the modified rules system to enforce the communications policy. As identified in FIG. 2, the method may return with the identified violated rules to repeat the calculating 51, analyzing 55, and determining 57 processes to further refine the modified rules system.

Figure 3:
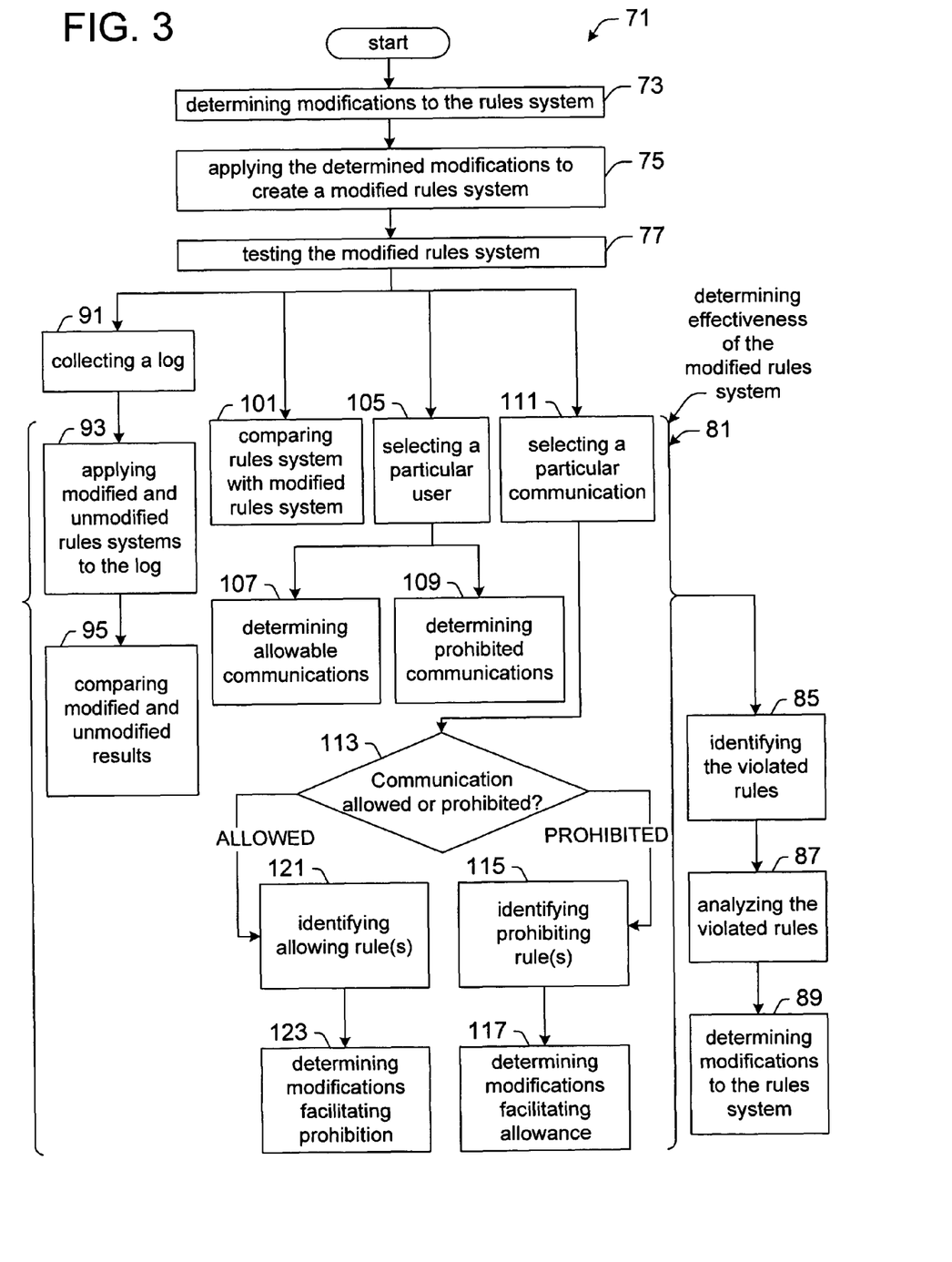
FIG. 3 is a flow diagram of a method of another embodiment of the invention.

In another alternative embodiment depicted in FIG. 3, a method 71 for determining effectiveness of planned modifications to a rules system is disclosed. The rules system applies one or more rules to communication traffic of a group of users, generally as set forth above, for conforming the communication traffic to a communications policy.

The method 71 comprises determining, at 73, modifications to the rules applied by the rules system facilitating conformance of the communication traffic to the communications policy. The method 71 further applies, at 75, the determined 73 modifications to the rules applied by the rules system to create a modified rules system. The method 71 then tests, at 77, the modified rules system on at least a portion of the communication traffic previously reviewed by an unmodified rules system. The method 71 may further determine, generally indicated 81, effectiveness of the modified rules system to conform the communication traffic to the communications policy based upon the testing. As discussed in detail below, this determining 81 may be accomplished in any number of ways without departing from the scope of the embodiments of the present invention.

In one example, the method 71 may further comprise identifying, at 85, one or more of the rules of the modified rules system violated by the communication traffic when the determining 81 effectiveness of the modified rules system determines that the communication traffic does not conform to the communications policy. The method 71 also analyzes, at 87, the violated rules to determine a basis for why the violated rules were not effective in conforming the communication traffic to the communications policy and determines, at 89, further modifications to the modified rules applied by the modified rules system facilitating conformance of the communication traffic to the communications policy. These modifications may then be utilized by the administrator of the rules system to improve the adherence of communications with the communications policy.

In another example, the method 71 may further collect, at 91, a log containing at least a portion of the communication traffic of a group of users subject to the communications policy. The collecting 91 the log from the communication traffic may comprise collecting at least one of an electronic mail communication log, an instant messaging communication log, and a file transfer protocol communication log. In addition, the determining 81 the effectiveness of the modified rules system comprises applying, at 93, both the unmodified rules system and the modified rules system to the log and comparing, at 95, the results. This particular example of the method 71 is useful in comparing the effectiveness of two different rules systems on the same set of communications. This can provide several benefits, including, specifically, selection of the appropriate rules system of the two compared and, generally, providing an understanding of how differences between rules systems impact effectiveness, which can be useful beyond the specific rules systems being compared.

In yet another example, the determining effectiveness 81 of the modified rules system comprises comparing 101 results of the testing of the modified rules system to results of reviewing the communication traffic by the unmodified rules system. This particular example of the method 71 is also useful in comparing the effectiveness of two different rules systems, the modified and unmodified systems. This method 71 can also provide several benefits, including, specifically, understanding the impact of the modified rules system and, generally, providing an understanding of how differences between rules systems impact effectiveness, which can be useful beyond the specific rules systems being compared.

In still another alternative embodiment, the determining 81 effectiveness of the modified rules system comprises selecting 105 a particular user. This method 71 is useful in understanding the impact of the modified rules system on a selected 105 user, such as a user whose communications are not being properly handles under the unmodified rules system or a user who has had a recent change in circumstances (e.g., changed organizations or position). This particular embodiment further includes at least one of determining, at 107, one or more allowable communications of the selected user under the modified rules system and determining, at 109, one or more prohibited communications of the selected user under the modified rules system. The administrator may then review these allowable and prohibited communications to determine if the modified rules system is properly handling communications by the selected user.

In yet another alternative embodiment, the determining 81 comprises selecting, at 111, a particular communication of the communication traffic and determining, at 113, at least one of if the selected communication is prohibited under the modified rules system and if the selected communication is allowable under the modified rules system. The method 71 of this alternative embodiment may further comprise identifying, at 115, at least one of the rules of the modified rules system prohibiting the selected communication when the determining 113 determines that the selected communication is prohibited under the modified rules system. The method 71 may further determine, at 117, modifications to the rules applied by the modified rules system facilitating allowance of the selected communication when the determining 113 determines that the selected communication is prohibited under the modified rules system. Alternately, the method 71 of this alternative embodiment may further comprise identifying, at 121, at least one of the rules of the modified rules system allowing the selected communication when the determining 113 determines that the selected communication is allowable under the modified rules system. The method 71 may further determine, at 123, modifications to the rules applied by the modified rules system facilitating prohibition of the selected communication when the determining 113 determines that the selected communication is allowable under the modified rules system.

General Purpose Computing Device

Figure 4:
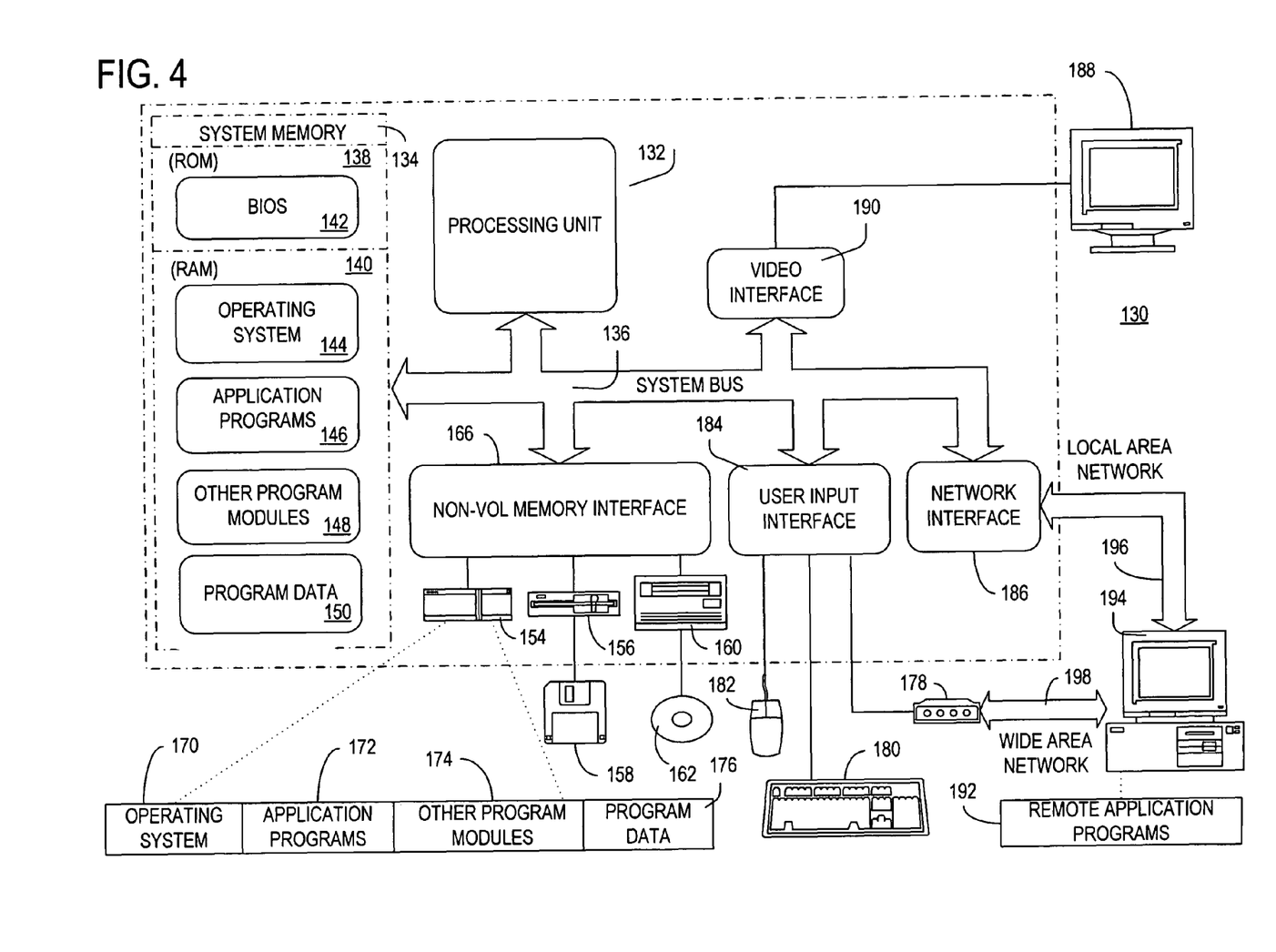
FIG. 4 is a block diagram illustrating one example of a suitable computing system environment in which one or more of the embodiments of the invention may be implemented.

FIG. 4 shows one example of a general purpose computing device in the form of a computer 130. In one embodiment of the invention, a computer such as the computer 130 is suitable for use in the other figures illustrated and described herein. Computer 130 additionally has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 4 illustrates operating system 144, application programs 146, other program modules 148, and program data 150.

The drives or other mass storage devices and their associated computer storage media discussed above and illustrated in FIG. 4, provide storage of computer readable instructions, data structures, program modules and other data for the computer 130. In FIG. 4, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, camera, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown). In one example, the user interfaces discussed above may be embodied by such input devices and monitors.

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 4 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 4 illustrates remote application programs 192 as residing on the memory device. It will be appreciated that the network connections shown are exemplary and other means of establishing a communications link between the computers may be used.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the embodiments of the invention are operational with numerous other general purpose or special purpose computing system environments or configurations. The computing system environment is not intended to suggest any limitation as to the scope of use or functionality of the embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, computer 130 executes a computer-implemented method of operation on one or more data processing devices such as described above for reviewing, by a computer, effectiveness of a rules system applying one or more rules adapted for conforming the communication traffic of a group of users to a communications policy. The computer 130 (or its components) analyzes a log containing one or more communications reviewed by the rules system to determine if the communications in the log conforms to the communications policy. The computer 130 (or its components) identifies one or more of the rules of the rules system violated by the communications when the analyzing the log determines that at least one of the communications in the log does not conform to the communications policy.

Also in operation, computer 130 executes a computer-implemented method of operation on one or more data processing devices such as described above for determining, by a computer, effectiveness of planned modifications to a rules system applying one or more rules adapted for conforming the communication traffic of a group of users to a communications policy. The computer 130 (or its components) determines modifications to the rules applied by the rules system facilitating conformance of the communication traffic to the communications policy. The computer 130 (or its components) applies the determined modifications to the rules system to create a modified rules system. The computer 130 (or its components) tests the modified rules system on at least a portion of the communication traffic previously reviewed by an unmodified rules system. The computer 130 (or its components) determines effectiveness of the modified rules system to conform the communication traffic to the communications policy based upon the testing.

Those skilled in the art will note that the order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A computerized method executable by a processor of a computing device for evaluating a rules system, said rules system applying one or more rules to communication traffic of a group of users for conforming the communication traffic to a communications policy, said method comprising:

analyzing a log containing one or more communications previously reviewed by the rules system to determine if the previously reviewed communications in the log conforms to the communications policy, said analyzing comprising determining at least one of the previously viewed communications that is a non-conforming communication which does not conform with the communications policy;

identifying one or more of the rules of the rules system violated by the non-conforming communication;

analyzing the violating rules to determine a basis for why the violating rules were not effective in conforming the communications in the log to the communications policy;

determining modifications to the rules system to facilitate conformance of the communication traffic to the communications policy;

applying the determined modifications to the rules system to create a modified rules system;

testing the modified rules system and the rules system on the communications in the log with test communications without applying the modified rules system to new communications;

determining effectiveness of the modified rules system and of the rules system to conform the test communications to the communication policy, said determining effectiveness comprising evaluating an aggregation risk metric quantifying the potential exposure created by the modified rules system compared to the rules system; and utilizing the modified rules system after determining effectiveness and as a function of the evaluated aggregation risk metric.

2. A computerized method as set forth in claim 1 wherein said determining modifications comprises at least one of adding an additional rule, deleting a rule, and modifying an existing rule.

3. A computerized method as set forth in claim 1 further comprising identifying one or more violating rules of the modified rules system during the testing when at least one of the test communications do not conform to the communications policy.

4. A computerized method as set forth in claim 1 further comprising collecting the log from the communication traffic of a group of users subject to the communications policy.

5. A computerized method as set forth in claim 4 wherein said collecting the log from the communication traffic comprises collecting at least one of an electronic-mail communication log, an instant messaging communication log, and a file transfer protocol communication log.

6. A computerized method executable by a processor of a computing device for evaluating planned modifications to an unmodified rules system, said unmodified rules system applying one or more rules to communication traffic of a group of users for conforming the communication traffic to a communications policy, said method comprising:

determining modifications to the rules applied by the unmodified rules system, said modified rules facilitating conformance of the communication traffic to the communications policy;

applying said determined modifications to the unmodified rules system to create a modified rules system;

testing the modified rules system and the unmodified rules system on an identical portion of the communication traffic, said communication traffic previously reviewed by the unmodified rules system; and determining effectiveness of the modified rules system and of the unmodified rules system to conform the identical portion of the communication traffic to the communications policy based upon the testing, said determining effectiveness further comprising evaluating an aggregation risk metric quantifying the potential exposure created by the modified rules system compared to the unmodified rules system.

7. A computerized method as set forth in claim 6 wherein said determining effectiveness of the modified rules system further comprises selecting a particular user, and at least one of determining one or more allowable communications of said selected user under the modified rules system, and determining one or more prohibited communications of said user under the modified rules system.

8. A computerized method as set forth in claim 6 wherein said determining effectiveness further comprises:

selecting a particular communication of the communication traffic; and determining at least one of if the selected communication is prohibited under the modified rules system and if the selected communication is allowable under the modified rules system.

9. A computerized method as set forth in claim 8 further comprising:
identifying at least one of the rules of the modified rules system prohibiting the selected communication if the selected communication is prohibited under the modified rules system; and
identifying the at least one of the rules of the modified rules system allowing the selected communication if the selected communication is allowable under the modified rules system.

10. A computerized method as set forth in claim 9 further comprising:
determining modifications to the rules applied by the modified rules system facilitating allowance of the selected communication if the selected communication is prohibited under the modified rules system; and
determining modifications to the rules applied by the modified rules system facilitating prohibition of the selected communication if the selected communication is allowable under the modified rules system.

11. A computerized method as set forth in claim 6 further comprising:
identifying one or more of the rules of the modified rules system violated by the communication traffic as violating the communication policy if the determining effectiveness of the modified rules system determines that the communication traffic does not conform to the communications policy;
analyzing the violating rules to determine a basis for why the violating rules were not effective in conforming the communication traffic to the communications policy; and
determining further modifications to the modified rules applied by the modified rules system facilitating conformance of the communication traffic to the communications policy.

12. A computerized method as set forth in claim 6 further comprising collecting a log containing at least a portion of the communication traffic of a group of users subject to the communications policy and wherein determining the effectiveness of the modified rules system comprises applying both the unmodified rules system and the modified rules system to the log and comparing the results.

13. A computerized method as set forth in claim 12 wherein said collecting the log from the communication traffic comprises collecting at least one of an electronic mail communication log, an instant messaging communication log, and a file transfer protocol communication log.

14. A control system for reviewing effectiveness of a rules system, said rules system applying one or more rules to communication traffic of a group of users, said rules being adapted for conforming the communication traffic to a communications policy, said control system comprising:
a memory area having stored thereon:
a rules store containing a copy of one or more rules applied by the rules system; and
a communications store for collecting one or more communications previously reviewed by the rules system; and
a processor configured to execute computer-executable instructions for accessing the memory area for:
analyzing the communications of the communications store to determine if the previously reviewed communications conform to the communications policy, said analyzing comprising determining at least one of the previously viewed communications that is not in conformance with the communications policy;
identifying, as a function of the non-conforming communication, one or more of the rules of the rules system in violation of the communications policy;
analyzing the violating rules to determine a basis for why the violating rules were not effective in conforming the non-conforming communications in the log to the communications policy;
determining modifications to the rules applied by the rules system to facilitate conformance of the communication to the communications policy;
applying the determined modifications to the rules system to create a modified rules system;
testing the modified rules system and the rules system on the communications in the log without applying the modified rules system to new communications; and
determining effectiveness of the modified rules system to conform the test communications to the communication policy, said determining effectiveness comprising evaluating an aggregation risk metric quantifying the potential exposure created by the modified rules system compared to the rules system.

15. A control system as set forth in claim 14 further comprising a user interface for communicating the violating rules to a user if at least one of the communications in the communications store does not conform to the communications policy.

* * * * *